May 27, 1924.
H. E. WARREN
MOTOR DRIVE
Filed April 12, 1922
1,495,936
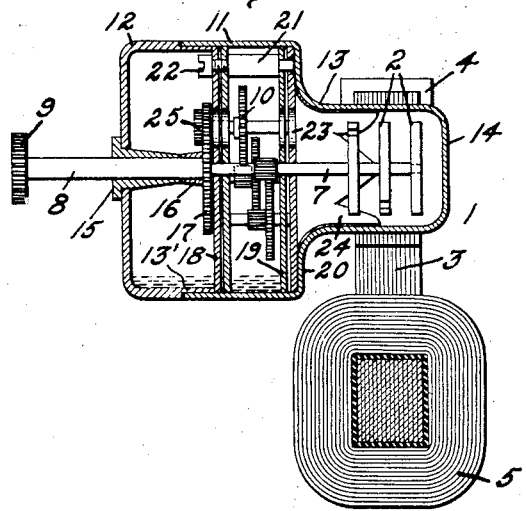
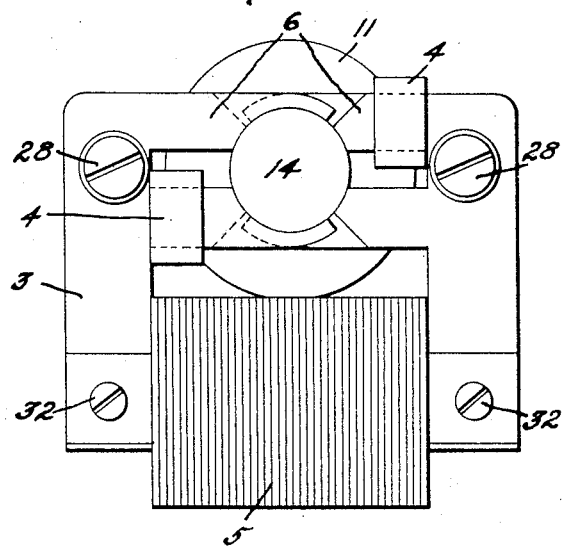
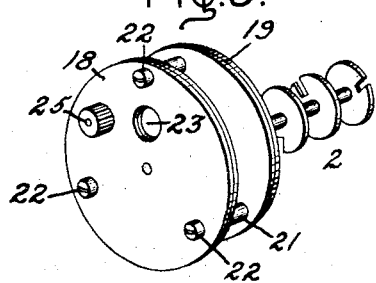
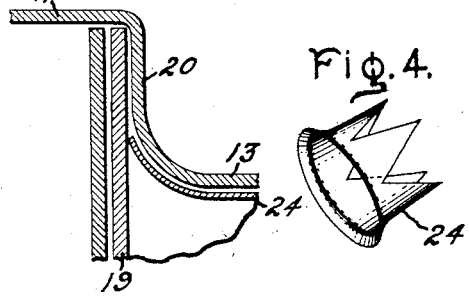
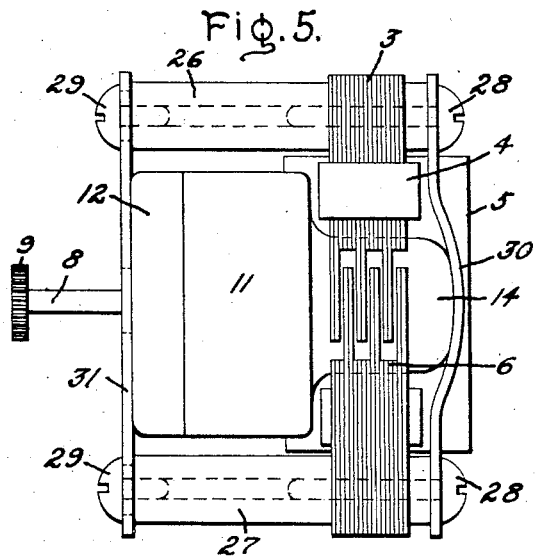
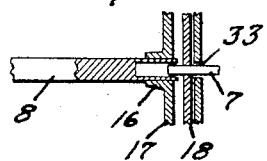
Inventor:
Henry E. Warren,
by Albert S. Davis
His Attorney.

Patented May 27, 1924.

1,495,936

UNITED STATES PATENT OFFICE.

HENRY E. WARREN, OF ASHLAND, MASSACHUSETTS, ASSIGNOR TO WARREN CLOCK COMPANY, A CORPORATION OF MAINE.

MOTOR DRIVE.

Application filed April 12, 1922. Serial No. 551,982.

*To all whom it may concern:*

Be it known that I, HENRY E. WARREN, a citizen of the United States, residing at Ashland, in the county of Middlesex, State of Massachusetts, have invented certain new and useful Improvements in Motor Drives, of which the following is a specification.

My present invention relates to motor drives and is an improvement over my application, Serial No. 407,487, filed September 1, 1920, entitled "Lubricating system" and a divisional application Serial No. 530,005, filed January 17, 1922, entitled "Motor drive," both assigned to the same assignee as the present invention.

In my prior applications I disclosed a motor drive comprising a motor combined with a gear casing unit, the gear casing containing the rotor element of the motor. The gear casing contained oil and the rotating parts contained therein were lubricated by capillary action.

One of the objects of my present invention is to provide means for keeping the rotor portion of this type of gear casing free from oil. Another object is to improve and simplify the mechanical design of the gear casing unit. Another object is to increase the torque available with this type of motor drive when the motor element is of the electric type. Other advantages of the improved motor drive will appear as the description proceeds.

The features which I believe to be novel and patentable will be pointed out in the claims appended hereto. The structural details and the operation of my improved motor drive will be described in connection with the accompanying drawings in which Fig. 1 is a sectional view showing the various elements of both the motor and the transmitting mechanism; Fig. 2 is an outline side view showing more clearly the relation between the motor and the enclosing case of the drive; Fig. 3 is a perspective view of the gearing supporting the framework removed from the casing; Fig. 4 is a perspective view of the oil removing bushing which extends into the rotor chamber of the gear casing; Fig. 5 is a top view of the assembled motor drive; Fig. 6 is a detail view of the inner end of the main drive shaft, and Fig. 7 is a detail view of the arrangement for removing oil from the rotor chamber by capillary action.

My invention may be used in connection with a motor 1, which I have shown in this case as the self-starting synchronous motor described in my copending application, Serial No. 521,590, filed December 12, 1921, entitled "Self-starting synchronous motor," and assigned to the same assignee as the present invention. It is of course to be understood that although I illustrate my invention in connection with this type of motor, certain aspects thereof may be used with all sizes or types of machinery or motors such as nonelectrical motors or prime movers. The particular motor shown comprises a rotor 2 and a stationary element consisting of a series of laminations 3, a plurality of shading coils 4 and an alternating exciting coil 5. As is more fully described in my copending application, Serial No. 521,590, the alternating magnetic field set up in the laminated magnetic circuit 3 by the exciting coil 5 is transformed into a rotating magnetic field by the interleaved pole pieces 6 and the shading coils 4 and thereby causes rotation of the rotor 2 which comprises in this case a plurality of split steel rings spaced and mounted for rotation on a shaft 7 between the pole pieces 6.

By the aid of my invention the speed of rotor 2 is modified and the power made available to drive a power shaft 8 which carries in this instance a driving pinion 9. This driving pinion may operate the load for which the apparatus is designed, such, for example, as the hands of an electrically actuated clock. The gear change and capacity of the drive will of course be designed in accordance with the purpose for which it is to be used and consequently I wish it to be understood that I contemplate such changes as may be made without departing from the scope of my invention.

Between the shaft 7 of rotor 2 and the power shaft 8 there are interposed a plurality of gears designated in general by the numeral 10. These gears modify the speed of rotor 2, in the present illustration a reduction thereof, and illustrate but one means of accomplishing the result. All the gears are totally enclosed by a gear case 11 and its cover 12. The cover 12 has a reduced flange 13' adapted to telescope into the casing 11 and form a good fit therewith. After the parts are assembled the joint formed between the cover and casing may be soldered or otherwise sealed if desirable. The cover and casing are preferably of the same outer dimensions so that a smooth outer surface is obtained. The gear case 11 has a cylindrical portion 13 closed at the end by a wall 14. This cylindrical portion totally encloses the motor rotor as illustrated in Fig. 1 and is adapted to be inserted within the inner periphery of the stationary field poles 1 of the motor so as to bring the rotor 2 into approximately the correct operating position therewith. The rotor 2 is preferably mounted concentric with the cylindrical portion 13 and that portion is adapted to fit snugly within the pole pieces so as to be held in position by friction. It will be obvious that the gear casing may be inserted into the motor field from either side which enables the direction of rotation to be reversed.

Power shaft 8 extends through the cover 12 and in order to prevent leakage of oil therefrom I provide a bushing 15 which has an oil tight fit with the casing and forms a bearing for shaft 8. The inner end of this bushing extends some distance within the casing and tapers toward the shaft and abuts against a flange 16 on gear wheel 17 which is secured to shaft 8. This construction effectively positions the gear 17 and prevents the escape of oil about shaft 8 and yet allows some oil to reach and lubricate said shaft in a manner to be more fully described later. The inner flange 13' of cover 12 abuts against the outer wall 18 of the gear supporting framework and holds said framework in place with its rear wall 19 against the rear wall 20 of the main gear chamber. When the cover 12 is removed shaft 8 and gear 17 may be removed with it thereby exposing the gear supporting framework. This fits rather closely within the casing but may readily be removed therefrom as a unit as illustrated in Fig. 3. The framework comprises a pair of spaced hollow walls 18 and 19, each wall being made up of two disc shaped pieces of metal slightly spaced apart so as to leave a capillary space between them best shown in Fig. 7. The two hollow walls are held together at three points by spacers 21. These spacers are preferably riveted to the rear wall so that the entire structure may be secured together by three screws 22 fastened through the front wall 18 into the spacing members 21. The walls are provided with holes 23 in order to equalize the air pressure in the various chambers thus formed. The various gear shafts are supported in proper alinement between these two walls and have bearings for the shafts therein. I have found it convenient to provide the bearings for the intermediate shafts in the inner sections of each wall letting the ends of the shafts abut against the outer sections of the wall thereby keeping the various gears in mesh and preventing excessive end play. It is necessary however to have one of the intermediate shafts extend through both sections of wall 18 where it carries a pinion 25 meshing with gear 17 thus completing the driving connection.

The enlarged portion of the casing is adapted to contain a small amount of lubricating oil as indicated in Fig. 1 and oil is conveyed to the various bearing surfaces through the hollow wall by means of capillary action in a manner more fully explained in my prior application, Serial No. 407,487. The walls 18 and 19 do not fit so closely within the casing 21 as to prevent the oil from flowing into the hollow portions thereof. Likewise, the abutting surfaces of walls 19 and 20 are sufficiently irregular to provide a slight capillary space between them. This is illustrated in an exaggerated manner in Fig. 7.

My improved motor drive is intended to be used in a substantially horizontal position such as illustrated in Fig. 1 and to be assembled at the factory with the lubricant within the casing and the latter sealed. If during shipment or for any other reason, the casing should be turned on its large end oil would not leak out about shaft 8 because the bushing 15 is of sufficient length to maintain its inner end above the level of the lubricant in all positions. If the casing is turned on its rotor end some or all of the lubricant would find its way into the rotor chamber and would seriously interfere with the motor operation unless some means are provided to return the oil to the main chamber when the casing is returned to its operative position. In order to quickly remove oil from rotor chamber under such circumstances, I provide a thin metal bushing 24 shown in Fig. 4 which is adapted to fit into the rotor chamber in the manner illustrated in Figs. 1 and 7 and to form therewith a narrow capillary space. The outside diameter of the bushing 24 is made slightly smaller than the inner diameter of the rotor chamber 13 so that when bushing 24 is inserted in place the two walls are separated by a narrow capillary space. For this purpose it is convenient to merely insert the bushing in the rotor chamber so that the two walls are slightly eccentric thereby providing a gradually increasing space from the bottom to the top between the two walls. The space at the top of the chamber is clearly illustrated in Fig. 7. The capillary space thus formed connects with the capillary space between the outer section of wall 19 and wall 20 of the casing thereby providing a conduit through which any oil contained in the rotor chamber will be quickly returned to the main reservoir when the motor occupies a horizontal position. Although the gear frame work is shown with equalizing holes 23 above the shaft, that is not essential so long as these holes are above the level of the oil in the reservoir and they might have been shown below shaft 7 instead of above it so far as the operation is concerned.

It will be noticed that the motor shaft 7 and the drive shaft 8 are centered with respect to the casing from which it will be evident that the angular relation of the gear framework and casing and likewise the angular relation between the casing and the motor field is immaterial. In order that the rotor 2 of the motor may axially aline itself with the motor field without the necessity of exact mechanical adjustment, I allow for a slight amount of end play of rotor shaft 7 and the parts carried thereby. To this end and in order to economize in space, I arrange the adjacent ends of the shafts 7 and 8 so as to telescope one within the other as illustrated in Fig. 6. Shaft 8 has a hollow portion into which shaft 7 may extend. This arrangement allows the rotor 2 to automatically center itself with respect to its field to the most efficient running position; at the same time ample bearing surface of shaft 7 is assured without lengthening the casing. It will also be observed from an inspection of Fig. 6 that shaft 8 extends slightly beyond gear 17 towards wall 18, thus slightly spacing gear 17 from the wall. This prevents the main portion of gear 17 from rubbing against wall 18 thus reducing the friction to a minimum. In order to permit the most effective circulation of oil a slight clearance is provided about shaft 7 in the two inner sections of walls 18 and 19. This is indicated in Fig. 6 at 33.

The casing 11 is preferably made of some nonmagnetic metal or material such as brass. When so made I find that the thin brass portion of the casing between the rotor and field of the motor does not decrease to any appreciable degree the torque and efficiency thereof.

It is preferable, although not essential, to provide the assembled motor drive with a framework to securely hold the field and casing in their proper relation. For this purpose I have shown in Fig. 5 a pair of posts 26 and 27 rigidly secured to the field laminations and extending axially to the extremities of the gear casing. These posts may also assist in holding the field laminations together. Thus instead of making each post in one piece, I make them in two sections adapted to clamp the field laminations between them by means of screws 28. Plates 30 and 31 join the respective ends of the posts and are secured thereto by screws or bolts 28 and 29. These plates extend diametrically across the two ends of the casing thus completing the framework and securely holding the casing and field structure in their proper relation. Plate 31 is provided with a central opening adapted to fit over the protruding end of bushing 15. This simple framework is effective to prevent displacement of any of the parts due to rough handling, vibration, etc. Plate 30, in addition to serving as part of the framework, may also be utilized as a nameplate and I have found it convenient to inscribe the motor rating and the gear reduction of the drive on its outer surface. This plate is omitted from Fig. 2 in order that the relation between the gear casing and field may be more clearly illustrated. The lower corners of the substantially rectangular magnetic circuit 3 are secured by screws or bolts 32. It will thus be observed that in the complete structure only nine screws or bolts are used, four in the laminated field structure, two in the outer end of the exterior framework and three in the interior gear supporting framework. This simple mechanical design affords an inexpensive motor drive unit without sacrificing reliability and ruggedness.

In accordance with the provisions of the patent statutes, I have described the principle of operation of my invention, together with the apparatus which I now consider to represent the best embodiment thereof; but I desire to have it understood that the apparatus shown is only illustrative and that the invention can be carried out by other means.

What I claim as new and desire to secure by Letters Patent of the United States, is:

1. A chambered casing for enclosing and supporting motion transmitting elements, a fluid contained in the bottom of said casing and a capillary conduit from the bottom of one of the chambers to the top of another of the chambers of said casing whereby said first mentioned chamber is kept free from said fluid.

2. A casing for enclosing and supporting relatively moving parts, a fluid in said casing, a chamber in said casing normally situated above the level of the fluid and means for removing fluid from said chamber by capillary action.

3. A gear casing having a main chamber adapted to contain a fluid in the bottom thereof and having another chamber containing a loosely fitting bushing adapted to form with the walls of the containing chamber a capillary conduit from the bottom to the top thereof, and a capillary space connecting the conduit thus formed with said main chamber above the level of said fluid whereby any fluid contained in said second mentioned chamber is removed to the main chamber by capillary action.

4. A motor drive comprising a stationary motor element, a rotating motor element, means for modifying the speed of said rotor element, a casing enclosing and supporting said rotor element and speed modifying means in separate chambers thereof, a liquid contained in said casing, an opening between said chambers above the level of said liquid when the casing is in operative position, and a capillary conduit between the bottom of the rotor enclosing chamber and the top of the other chamber.

5. A motor drive comprising a motor and a speed modifying gearing therefor, a cylindrical casing for enclosing the rotor portion of said motor and said gearing, a power shaft connected to said rotor through said gearing and extending through a wall of said casing, a framework removably mounted in said casing for supporting said rotor and gearing and adapted to divide said casing into chambers, a cylindrical bushing in one of said chambers adapted to form, with the walls of said casing and framework, a capillary conduit between the bottom of its containing chamber and an adjacent chamber, said power shaft, framework, bushing and rotor being centrally mounted in said casing whereby the various parts may be assembled without regard for their angular relation.

6. A motor drive comprising a motor having a stationary element and a rotor, a shaft for said rotor, a gear case totally enclosing said rotor, that portion which encloses the rotor being held within the inner periphery of said stationary element, a power shaft extending from the gear case in alinement with the shaft of the motor rotor, motion transmitting gearing between said shafts, a wall for supporting said gearing having bearing surfaces for both of said shafts, said shafts being telescoped one within the other in order to allow for end play of one of said shafts.

7. A motor drive comprising an electric motor having a stationary member and a rotor, a gear case totally enclosing said rotor, that portion of which encloses the rotor being held within the inner periphery of said stationary member, an oil removing bushing extending into said rotor enclosing portion, the portions of said bushing and casing enclosed by said stationary member having such dimensions and characteristics as not to interfere with the operation of said motor.

8. A motor drive comprising in combination a self starting synchronous motor having a laminated stationary member and a rotating member, a gear case totally enclosing said rotating member, that portion of which encloses the rotating member being held within the inner periphery of said stationary member, a power shaft extending from said casing, speed changing gearing connected between said power shaft and said rotating element and a framework arranged to clamp the laminations of said stationary member together and to hold the gear casing in fixed operative relation therewith.

In witness whereof, I have hereunto set my hand this 8th day of April 1922.

HENRY E. WARREN.